United States Patent
Jean et al.

(10) Patent No.: US 10,414,043 B2
(45) Date of Patent: Sep. 17, 2019

(54) SKEW AND CIRCULAR BOUNDARY FOR LINE TRACKING AND CIRCULAR TRACKING

(71) Applicant: FANUC AMERICA CORPORATION, Rochester Hills, MI (US)

(72) Inventors: Min Ren Jean, Rochester Hills, MI (US); Ganesh Kalbavi, Rochester, MI (US); Sai-Kai Cheng, Rochester Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 83 days.

(21) Appl. No.: 15/420,777

(22) Filed: Jan. 31, 2017

(65) Prior Publication Data

US 2018/0215034 A1    Aug. 2, 2018

(51) Int. Cl.
*B25J 9/00* (2006.01)
*G05B 19/418* (2006.01)

(52) U.S. Cl.
CPC ........ *B25J 9/0093* (2013.01); *G05B 19/4182* (2013.01); *G05B 2219/40007* (2013.01)

(58) Field of Classification Search
CPC combination set(s) only.
See application file for complete search history.

(56) References Cited

U.S. PATENT DOCUMENTS

| 6,313,595 B2 | 11/2001 | Swanson et al. |
| 9,089,966 B2 | 7/2015 | Domae et al. |
| 2005/0075752 A1 | 4/2005 | Ban et al. |
| 2013/0173051 A1* | 7/2013 | Bellante ............ G05B 19/4182 |
| | | 700/230 |

FOREIGN PATENT DOCUMENTS

| EP | 1569776 A1 | 9/2005 |
| JP | H05104465 A | 4/1993 |
| JP | 2011140084 A | 7/2011 |
| JP | 2011140085 A | 7/2011 |
| WO | 2004052596 A1 | 6/2004 |
| WO | 2016094925 A1 | 6/2016 |

* cited by examiner

*Primary Examiner* — Kyle O Logan
(74) *Attorney, Agent, or Firm* — William J. Clemens; John A. Miller; Shumaker, Loop & Kendrick, LLP

(57) ABSTRACT

A method for controlling motion of a robot relative to a conveyor flow direction of a moving conveyor includes the steps of: establishing a tracking frame for coordinating a position and movement of the robot relative to an object support surface of the conveyor; setting an upstream boundary perpendicular or skewed to a conveyor flow direction of the conveyor; setting a downstream boundary perpendicular or skewed to the conveyor flow direction; optionally setting a circular boundary partially overlapping the upstream boundary and the downstream boundary, wherein the upstream boundary, the downstream boundary and the circular boundary are positioned to define a picking area relative to the support surface; and operating the robot to pick objects from the picking area.

18 Claims, 8 Drawing Sheets

SKEW AND CIRCULAR BOUNDARY FOR LINE TRACKING AND CIRCULAR TRACKING

FIELD OF THE INVENTION

The invention relates to flexible methods of defining the picking area of a robot relative to a moving conveyor transporting parts to be picked.

BACKGROUND OF THE INVENTION

This section provides background information related to the present disclosure which is not necessarily prior art.

In the prior art, the boundaries (also known as tracking boundaries)—often referred to the upstream boundary "UB" and the downstream boundary "DB'—that confine the robot's work area on a conveyor could only be defined by straight lines perpendicular to the flow direction of the parts on the conveyor surface. A robot can pick a part on the conveyor when it is in the picking area. The picking area is defined by the intersection of the circular work envelope of the robot and the boundaries UB and DB.

In prior art, the motion software controlling the motion of the robot allows the robot to pick or place as soon as a part is downstream of the upstream boundary UB. This is done even if the part is actually outside the work envelope. If the part is downstream of the upstream boundary, but outside the work envelope, the robot faults with a "Position not reachable" error causing downtime.

It is always desirable to maximize the picking area so that the robot has the ability to pick or place the maximum number of parts. However, if the distance between the perpendicular upstream and downstream boundaries is increased, then the probability of the "Position not reachable" error increases because the not reachable areas for parts increases.

To avoid the above described shortcomings, users have to perform complex custom programming to prevent the robot from picking in the not reachable areas and pick only in the picking area. This adds to robot software complexity and expense.

The restriction to use only straight perpendicular boundaries makes it impossible to maximize the picking area of the robot when there are objects or obstacles such as other machines or robots in the work envelope of the robot. The restriction to use only straight perpendicular boundaries does not allow the robot to not pick those parts that are on the edge of the work envelope in certain applications where it was desired for improving the picking rate.

While the prior art describes methods for avoiding collisions while operating robots, skew boundaries and circular boundaries for defining a picking area on a conveyor are not mentioned.

BRIEF SUMMARY OF THE INVENTION

In concordance with the instant disclosure, the invention involves a first flexible method that allows a robot picking area on a conveyor to be bounded by skewed boundaries. A second flexible method allows the robot picking area on the conveyor to be bounded by a circular boundary that is smaller than a circular work envelope of the robot. It is contemplated that the picking area of the robot is defined using the following boundaries:

1. A straight upstream boundary can be perpendicular to a longitudinal axis or conveyor flow direction of the conveyor (as in the prior art) or skewed according to the invention.
2. A straight downstream boundary can be perpendicular or skewed.
3. A circular boundary can be used in conjunction with the boundaries 1 and 2 above.

According to the invention, a method for controlling motion of a robot relative to a conveyor flow direction of a moving conveyor, comprises the steps of: setting an upstream boundary traverse to the conveyor flow direction relative to an object support surface of the conveyor; setting a downstream boundary traverse to the conveyor flow direction relative to the support surface, at least one of the upstream boundary and the downstream boundary being skewed relative to a direction perpendicular to the conveyor flow direction, the upstream boundary and the downstream boundary being positioned to define a picking area therebetween relative to the support surface; and operating the robot in the picking area to at least one of pick objects from and place objects on the support surface confined by the upstream boundary and the downstream boundary.

The method includes: setting the upstream boundary skewed relative to the perpendicular direction and the downstream boundary aligned with the perpendicular direction; or setting the downstream boundary skewed relative to the perpendicular direction and the upstream boundary aligned with the perpendicular direction; or setting the upstream boundary and the downstream boundary skewed relative to the perpendicular direction. The method includes setting the upstream boundary and the downstream boundary skewed at different angles relative to the perpendicular direction.

The robot has a circular work envelope superimposed on the support surface and the method can include setting a circular boundary with a diameter smaller than a diameter of the work envelope and superimposing the circular boundary on the upstream boundary and the downstream boundary to further define the picking area. The method includes positioning a center of the circular boundary on a longitudinal axis of the support surface. The method includes positioning a center of the circular boundary offset from a longitudinal axis of the support surface. The method includes setting the diameter of the circular boundary larger than a width of the support surface. The method includes setting the diameter of the circular boundary smaller than or equal to a width of the support surface.

The method includes skewing the at least one boundary at an angle to exclude an obstacle from the picking area.

According to the invention, a method for controlling motion of a robot relative to a conveyor flow direction of a moving conveyor includes the steps of: establishing a tracking frame for coordinating a position and movement of the robot relative to an object support surface of the conveyor; setting an upstream boundary traverse to a conveyor flow direction of the conveyor; setting a downstream boundary traverse to the conveyor flow direction; setting a circular boundary partially overlapping the upstream boundary and the downstream boundary, wherein the upstream boundary, the downstream boundary and the circular boundary are positioned to define a picking area relative to the support surface; and operating the robot to pick objects from the picking area confined by the upstream boundary, the downstream boundary and the circular boundary.

BRIEF DESCRIPTION OF THE SEVERAL VIEWS OF THE DRAWING

The above as well as other advantages of the invention will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

This invention introduces the concept of circular and skewed boundaries for defining a robot picking area relative to a conveyor surface supporting objects to be picked. With the concepts according to the invention, the robot is not only able to overcome the shortcomings of the prior art but also to provide additional benefits to suit the requirements of the robot-picking application for objects on a conveyor.

Figure 1:
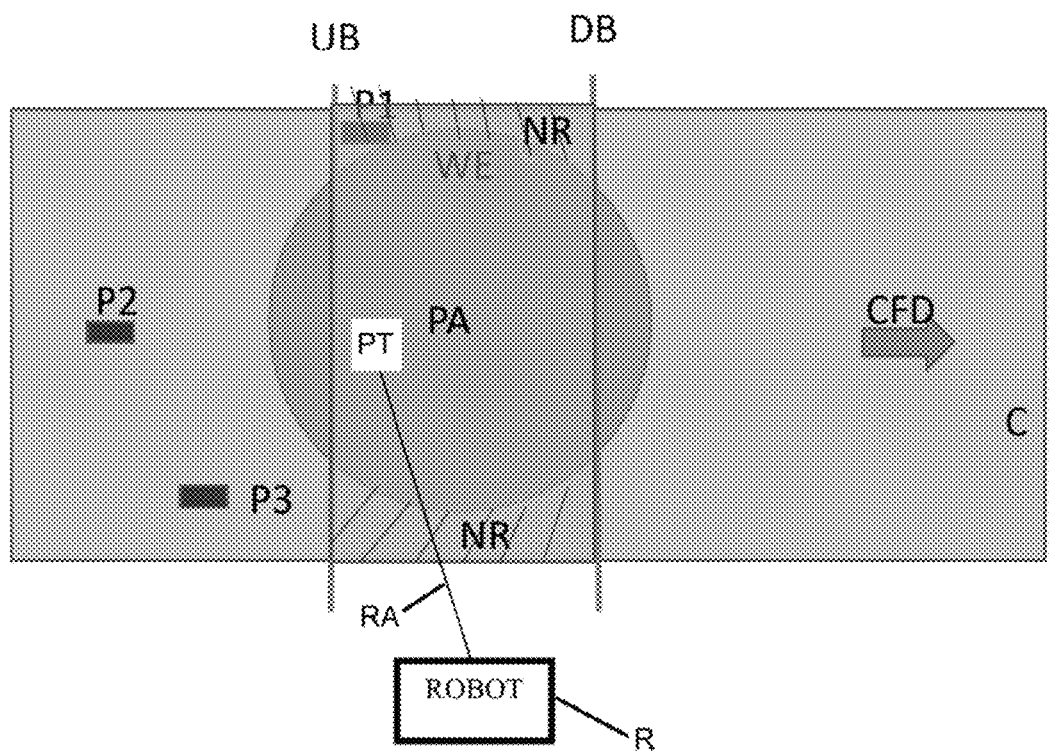
FIG. 1 is a top plan view schematic diagram of a conveyor showing a prior art robot picking area confined by upstream and downstream boundaries perpendicular to the conveyor flow direction.

FIG. 1 shows a conveyor C and a working area WE of a robot R with a robot arm RA according to a prior art configuration. Virtual boundaries (also known as tracking boundaries) are identified as an upstream boundary UB and a downstream boundary DB. These boundaries confine the robot's picking area PA on the conveyor C and could only be defined by the user in the robot controller picking application program to be straight lines extending perpendicular to a conveyor flow direction CFD of parts (P1, P2, P3) on the conveyor surface. The robot R can pick a part on the conveyor C when a picking tool PT at the end of the robot arm RA is in the picking area PA. The picking area PA is confined by the intersection of the periphery of the circular work envelope WE of the robot R and the boundaries UB and DB.

In the prior art, the motion software running on the robot controller allows robot motion to pick or place as soon as a part has moved downstream of the upstream boundary UB. This picking is done even if the part is actually outside the work envelope WE. In FIG. 1, the part P1 is downstream of the upstream boundary UB but outside the work envelope WE in a "Not Reachable" area NR. In this case, the robot R faults with a "position not reachable" error causing system downtime as a first shortcoming of the prior art system.

It is always desirable to maximize the picking area PA so that the robot R has the ability to pick or place the maximum number of parts. However, if the distance between the upstream boundary UB and the downstream boundary DB is increased, then the probability of the first shortcoming above increases because the "Not Reachable" areas NR for the parts increase as a second shortcoming of the prior art system.

To avoid the first and second shortcomings of the prior art systems, users have to perform complex custom programming to prevent the robot R from attempting to pick in the NR areas and pick only in the picking area PA to prevent downtime. This adds to robot software complexity and expense.

The prior art restriction to use only straight perpendicular boundaries UB and DB made it impossible to maximize the picking area PA of the robot R when there were objects or obstacles such as other machines or robots in the work envelope WE of the robot.

The prior art restriction to use only straight perpendicular boundaries UB and DB did not allow the robot R to pick those parts that are on the edge of the work envelope WE in certain applications where it was desired to do so for improving the picking rate.

Figure 2:
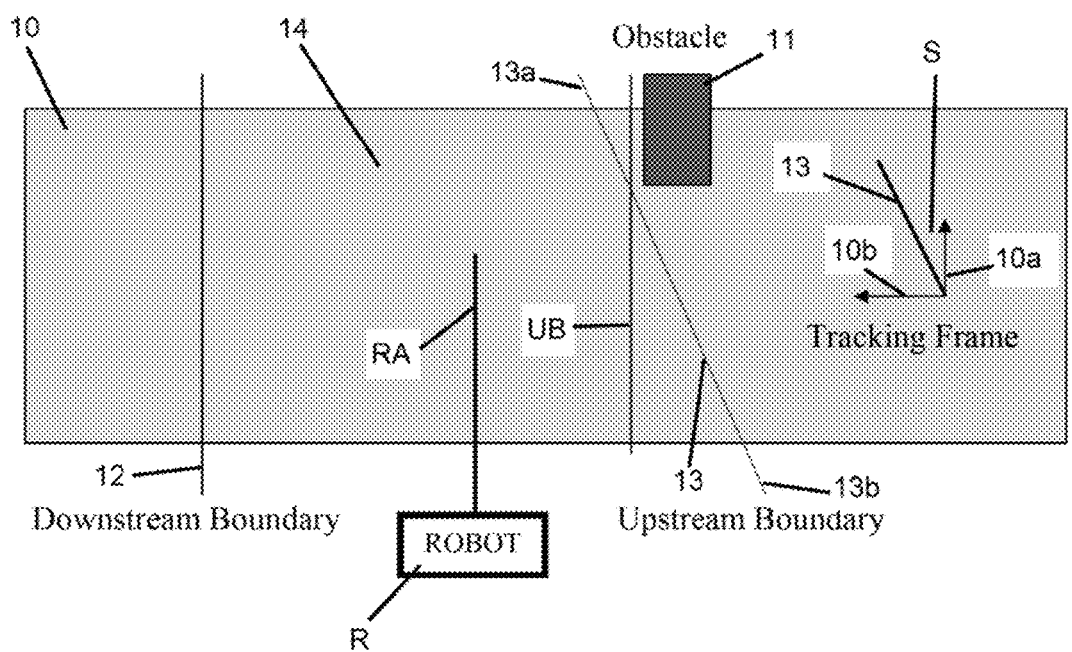
FIG. 2 is a top plan view schematic diagram of a conveyor showing a robot picking area confined by perpendicular downstream boundary and a skewed upstream boundary according to the invention.

FIG. 2 is a top plan view schematic diagram of a conveyor 10 showing an obstacle 11 to be avoided by the robot R when picking objects from the surface of the conveyor. A downstream boundary 12 extends perpendicular (Y axis direction of arrow 10a of a tracking frame) to a longitudinal direction of movement (X axis arrow 10b) across the width of the conveyor 10. An upstream boundary 13 is spaced from the boundary 12, extends across the width of the conveyor 10 and is skewed at a predetermined angle from the perpendicular direction 10a. The skew angle S is depicted with reference to the tracking frame. The boundaries 12 and 13 extend upwardly from the surface of the conveyor 10 (see FIG. 6) in a Z axis of the tracking frame. One end 13a of the upstream boundary 13 is positioned adjacent the obstacle 11 and an opposite end 13b is positioned a greater distance from the downstream boundary 12 than the end 13a. The boundaries 12 and 13 confine the robot R to a picking area 14 therebetween on the conveyor surface with the obstacle 11 being outside the picking area. The downstream boundary 12 and the upstream boundary 13 are virtual boundaries established by a controller of the robot to limit movement of the robot arm to the picking area 14 when picking objects from the surface of the conveyor 10. The skew boundary 13 allows the robot user to define a picking area with no obstacle or collision hazard within that picking area, which picking area 14 is larger than one defined by a perpendicular upstream boundary such as the upstream boundary UB shown in FIG. 1.

Figure 3:
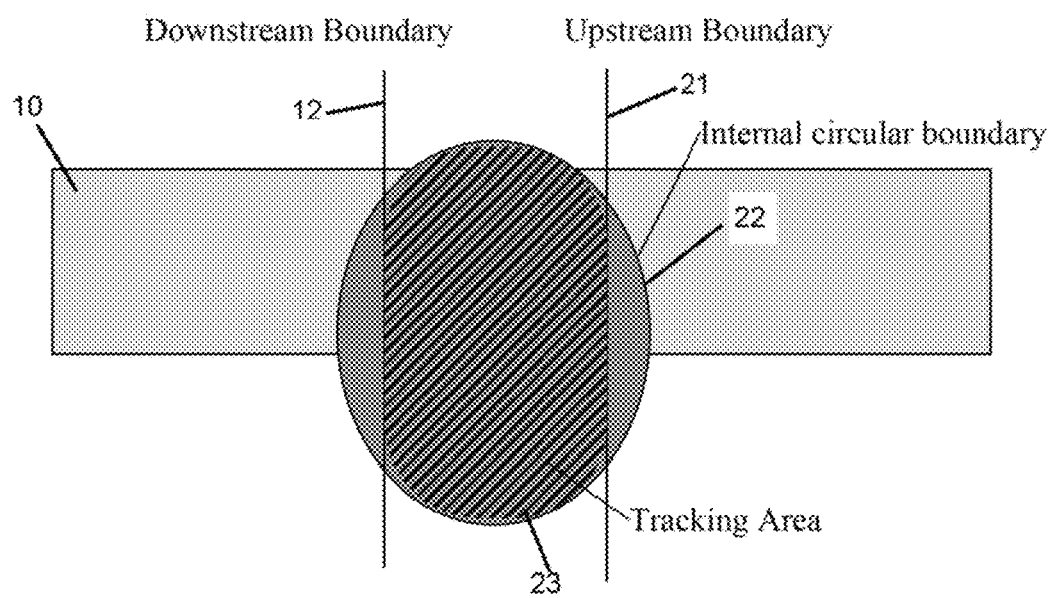
FIG. 3 is a top plan view schematic diagram of a conveyor showing a robot picking area confined by a circular boundary and perpendicular upstream and downstream boundaries according to the invention.

FIG. 3 is a top plan view schematic diagram of the conveyor 10 showing the downstream boundary 12 that extends perpendicular to the longitudinal direction of movement of and across the width of the conveyor 10. An upstream boundary 21 is spaced from the boundary 12 and extends perpendicular to the longitudinal direction of movement across the width of the conveyor 10. A superimposed internal circular boundary 22 overlaps the boundaries 12 and 21 and extends beyond both edges of the conveyor 10. A tracking area 23 is surrounded by the boundaries 12, 21 and 22 and includes a picking area where the tracking area overlaps the surface of the conveyor 10. The downstream boundary 12, the upstream boundary 21 and the circular boundary 22 are virtual boundaries established by a controller of the robot (no shown) to limit movement of the robot arm to the tracking area 23 when picking objects from the surface of the conveyor 10. The circular boundary 22 allows the robot user to define a picking area with no obstacle or collision hazard within that picking area.

According to the invention, the circular boundary 22 shown in FIG. 3 allows the user to define the robot reachable work area within a defined area on the conveyor. A combination of the circular boundary 22 and the skewed boundary 13 shown in FIG. 2 would allow the user to maximize the robot work area that the robot can always reach and be free of a collision hazard. The circular boundary 22 has a diameter greater than a width of the conveyor 10. However, the diameter could be equal to or smaller than the conveyor width. Also, the center of the circular boundary 22 is offset relative to a longitudinal axis of the conveyor 10, but could be centered on the conveyor.

Figure 4:
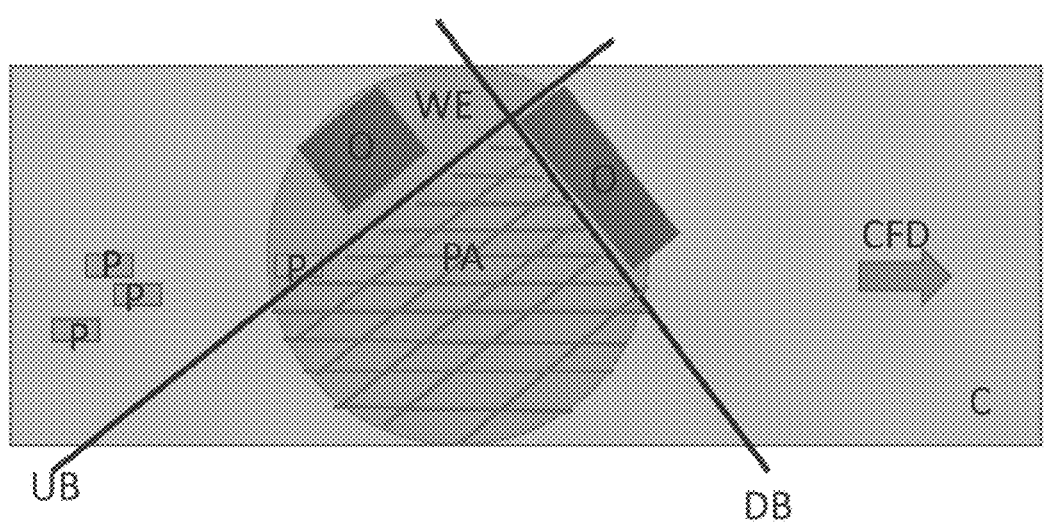
FIG. 4 is a top plan view schematic diagram of a conveyor showing a robot picking area confined by skewed upstream and downstream boundaries according to the invention.

FIG. 4 shows an embodiment of the invention where the boundaries UB and DB are both skewed relative to the conveyor flow direction CFD of the conveyor C. Objects O are positioned in the work envelope WE of the robot (not shown). The picking area PA is confined by the skewed upstream and downstream boundaries UB and DB to avoid the objects O. The robot only picks the parts P that are in the picking area PA with no extra programming steps. In the prior art system, which system only allows straight boundaries as shown in FIG. 1, either the picking area of the robot is considerably reduced (allowing it to pick only a few parts) or the robot runs the risk of colliding with the objects O.

Figure 5:
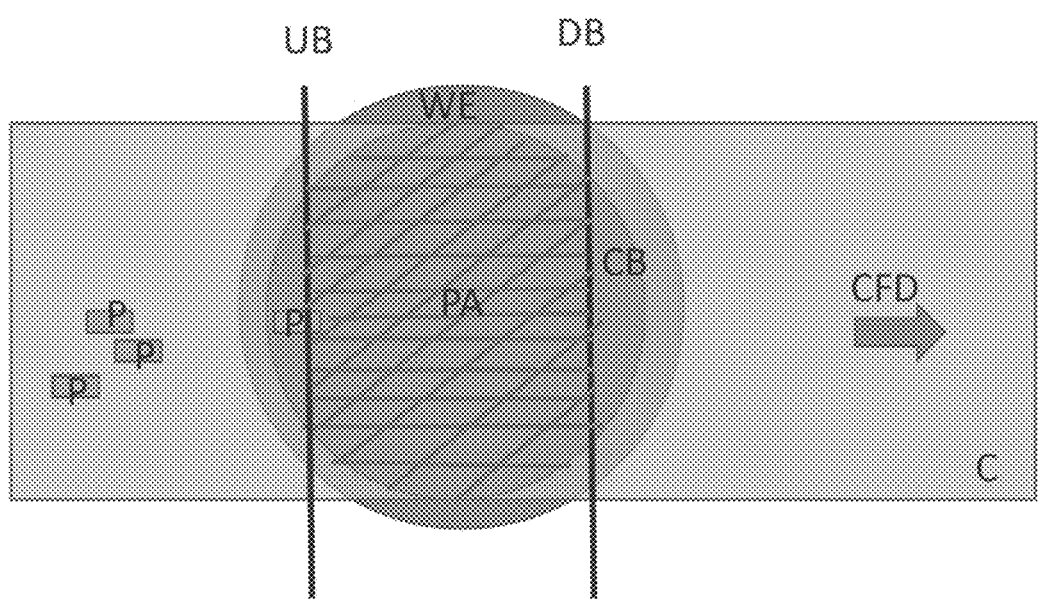
FIG. 5 is a top plan view schematic diagram of a conveyor showing a robot picking area confined by a circular boundary and perpendicular upstream and downstream boundaries according to the invention.

Referring to FIG. 1, in the prior art system it was not possible to define a circular boundary in addition to the perpendicular boundaries UB and DB. In FIG. 5, the robot (not shown) picks the parts P in the picking area PA which is the intersection of a circular boundary CB (smaller in diameter than the work envelope circle WE) with the perpendicular boundaries UB and DB. This feature is important because in some applications the robot should not pick close to the edge of the work envelope WE because it takes longer to travel that distance, increases cycle time and reduces the picking rate. This is simply an application requirement. The method according to the invention allows this capability with no extra programming.

Figure 6:
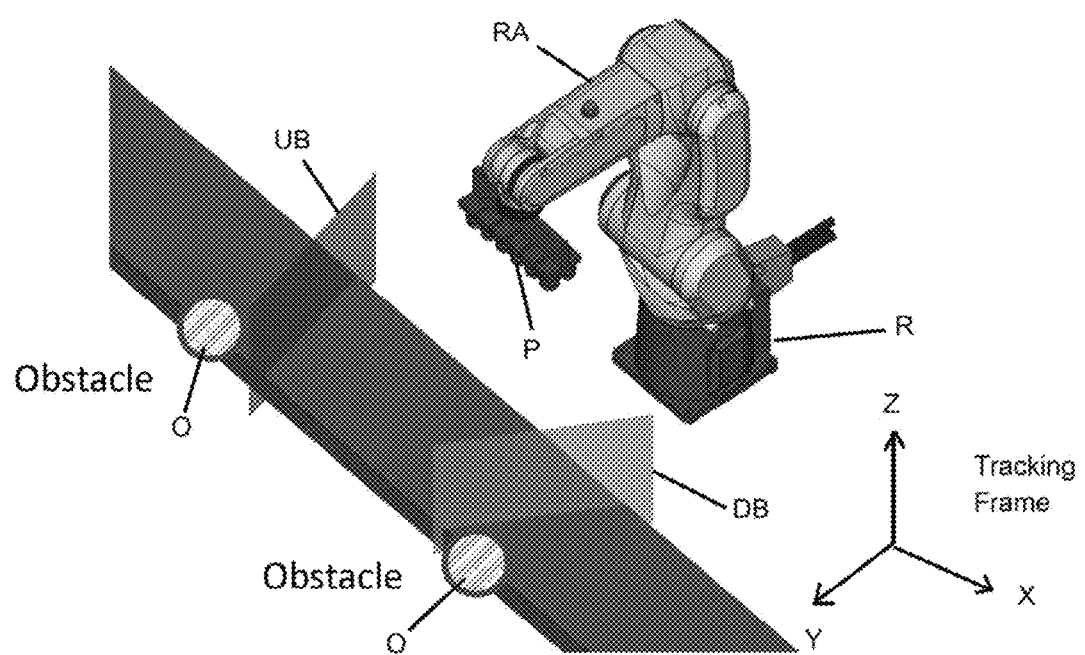
FIG. 6 is a perspective view of a conveyor and a robot showing a robot picking area confined by skewed upstream and downstream boundaries according to the invention.

FIG. 6 is a perspective view of the conveyor C with the picking robot R positioned adjacent thereto. Similar to FIG. 4, the robot picking area PA is confined by a pair of skewed boundaries UB and DB according to the invention. Each of the upstream boundary UB and the downstream boundary DB is in a skewed positioned to prevent the robot R from colliding with an adjacent object O when picking or placing the part P.

According to the above description of the invention and the associated drawings, the method of the invention enables a user to set virtual boundaries to confine a robot to a desired picking area. The user sets an upstream boundary to be perpendicular or skewed and a downstream boundary to be perpendicular or skewed. The user can add a circular boundary. The boundaries can be set to avoid obstacles and maximize the robot picking area.

Figure 7:
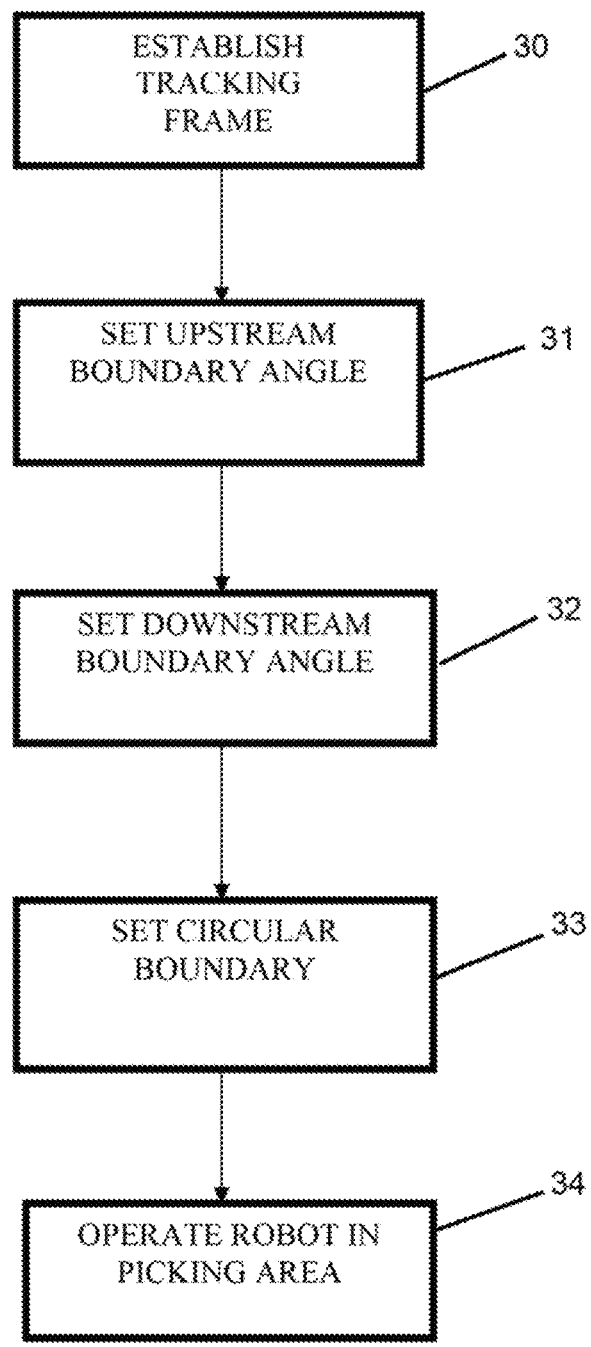
FIG. 7 is a flow diagram of a method of setting robot picking area boundaries according to the invention.

FIG. 7 is a flow diagram of a method of setting robot picking area boundaries according to the invention. The method starts with a step 30 wherein the user establishes a tracking frame correlating the position and movement of the robot with the position of the conveyor surface and the positions of the boundaries. In a step 31, the user sets the skew angle of the upstream boundary with 0° being perpendicular to the conveyor flow direction. In a step 32, the user sets the skew angle of the downstream boundary with 0° being perpendicular to the conveyor flow direction. In a step 33, the user sets the diameter of the circular boundary and a position of the center of the circular boundary if a circular boundary is desired. In a step 34, the robot is operated to pick and/or place objects in the picking area confined by the set boundaries.

Figure 8:
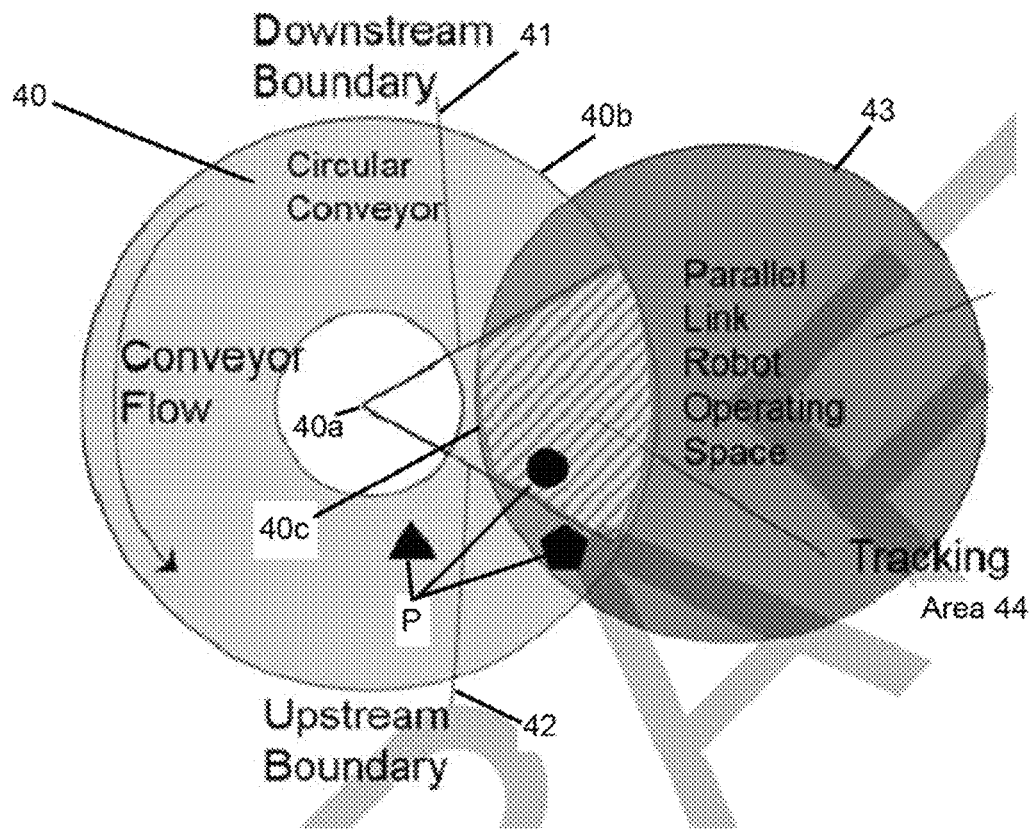
FIG. 8 is a top plan view schematic diagram of a circular conveyor showing a robot picking area confined by radial upstream and downstream boundaries according to the invention.

The method according to the invention has been described with reference to linear conveyors. However, the method also can be used to set boundaries for picking parts from a circular conveyor. FIG. 8 shows a circular conveyor 40, shaped as a ring, rotating about an axis of rotation 40a. A straight line downstream boundary 41 extends radially from the axis 40a to a periphery 40b of the conveyor. A straight line upstream boundary 42 also extends radially from the axis 40a to the periphery 40b at an angle from the downstream boundary 41 such that an annular segment 40c of the conveyor 40 lies between the radial boundaries. A circular boundary 43 is set to overlap the radial boundaries 41 and 42 at the surface of the conveyor. Thus, the radial boundaries 41 and 42, the circular boundary 43 and the conveyor periphery 40b define a tracking or picking area 44 for picking and/or placing parts P.

In summary, the method according to the invention allows flexible methods to define the picking area of a robot on a moving conveyor containing parts. There are two flexible methods: 1) Allow the picking area on the conveyor to be bounded by skewed boundaries; and 2) Allow the picking area on the conveyor to be bounded by a circular boundary that is smaller than the circular work envelope of the robot. It is possible to define a picking area of the robot using the following combination of boundaries: A) an upstream boundary can be perpendicular (as in the prior art) or skewed; B) a downstream boundary can be perpendicular or skewed; and C) a circular boundary can exist in conjunction with items A and B.

A benefit of the method according to the invention is that there is no downtime caused by the robot trying to reach an unreachable part and faulting. Another benefit is that the picking area takes into account the realistic constraints in the factories where the picking robot is used such as obstacles, machinery or other robots that need to share the space with the picking robot. A further benefit is that there is no additional programming required to implement the method according to the invention.

In accordance with the provisions of the patent statutes, the invention has been described in what is considered to represent its preferred embodiment. However, it should be noted that the invention can be practiced otherwise than as specifically illustrated and described without departing from its spirit or scope.

The invention claimed is:

1. A method for controlling motion of a robot relative to a conveyor flow direction of a moving conveyor, comprising the steps of:
   setting, in a robot controller, an upstream boundary traverse to the conveyor flow direction relative to an object support surface of the conveyor;
   setting, in the robot controller, a downstream boundary traverse to the conveyor flow direction relative to the support surface, at least one of the upstream boundary and the downstream boundary being skewed relative to a direction perpendicular to the conveyor flow direction, the upstream boundary and the downstream boundary being positioned to define a picking area therebetween relative to the support surface, including skewing the at least one boundary at an angle to exclude a fixed obstacle from the picking area while maximizing a size of the picking area; and operating the robot, using commands from the robot controller, in the picking area to at least one of pick objects from and place objects on the support surface confined by the upstream boundary and the downstream boundary.

2. The method according to claim 1 including setting the upstream boundary skewed relative to the perpendicular direction and the downstream boundary aligned with the perpendicular direction.

3. The method according to claim 1 including setting the downstream boundary skewed relative to the perpendicular direction and the upstream boundary aligned with the perpendicular direction.

4. The method according to claim 1 including setting the upstream boundary and the downstream boundary skewed relative to the perpendicular direction.

5. The method according to claim 1 including setting the upstream boundary and the downstream boundary skewed at different angles relative to the perpendicular direction.

6. The method according to claim 1 wherein the robot has a circular work envelope superimposed on the support surface and including setting a circular boundary with a diameter smaller than a diameter of the work envelope and superimposing the circular boundary on the upstream boundary and the downstream boundary to further define the picking area.

7. The method according to claim 6 including positioning a center of the circular boundary on a longitudinal axis of the support surface.

8. The method according to claim 6 including positioning a center of the circular boundary offset from a longitudinal axis of the support surface.

9. The method according to claim 6 including setting the diameter of the circular boundary larger than a width of the support surface.

10. The method according to claim 6 including setting the diameter of the circular boundary smaller than or equal to a width of the support surface.

11. A method for controlling motion of a robot relative to a conveyor flow direction of a moving conveyor, comprising the steps of:

establishing, in a robot controller, a tracking frame for coordinating a position and movement of the robot relative to an object support surface of the conveyor;

setting, in the robot controller, an upstream boundary traverse to a conveyor flow direction of the conveyor;

setting, in the robot controller, a downstream boundary traverse to the conveyor flow direction;

setting, in the robot controller, a circular boundary partially overlapping the upstream boundary and the downstream boundary, wherein the robot has a circular work envelope superimposed on the support surface and the circular boundary has a diameter smaller than a diameter of the work envelope and is contained within the work envelope, and wherein the upstream boundary, the downstream boundary and the circular boundary are positioned to define a picking area relative to the support surface; and operating the robot, using commands from the robot controller, to pick objects from the picking area confined by the upstream boundary, the downstream boundary and the circular boundary.

12. The method according to claim 11 including setting the upstream boundary skewed relative to the perpendicular direction and the downstream boundary aligned with the perpendicular direction.

13. The method according to claim 11 including setting the downstream boundary skewed relative to the perpendicular direction and the upstream boundary aligned with the perpendicular direction.

14. The method according to claim 11 including setting the upstream boundary and the downstream boundary skewed relative to the perpendicular direction.

15. The method according to claim 11 including setting the upstream boundary and the downstream boundary skewed at different angles relative to the perpendicular direction.

16. The method according to claim 11 including positioning a center of the circular boundary on a longitudinal axis of the support surface or offset from the longitudinal axis of the support surface.

17. The method according to claim 11 including setting the diameter of the circular boundary one of larger than, smaller than or equal to a width of the support surface.

18. The method according to claim 11 including skewing at least one of the upstream boundary and the downstream boundary at an angle relative to a direction perpendicular to the conveyor flow direction to exclude an obstacle from the picking area.

* * * * *